US012652256B2

(12) United States Patent
Dohadwala et al.

(10) Patent No.: US 12,652,256 B2
(45) Date of Patent: Jun. 9, 2026

(54) SCHEDULING MECHANISMS FOR APPROXIMATING FINE-GRAINED, PER-FLOW RATE ADJUSTMENTS AND CYCLE-GRANULARITY INTER-PACKET SPACING IN NETWORK APPLICATIONS

(71) Applicant: Microsoft Technology Licensing, LLC, Redmond, WA (US)

(72) Inventors: Mohammad Saifee Dohadwala, Redmond, WA (US); Michael K. Papamichael, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 18/213,215

(22) Filed: Jun. 22, 2023

(65) Prior Publication Data

US 2024/0430212 A1 Dec. 26, 2024

(51) Int. Cl.
*G06F 15/173* (2006.01)
*H04L 47/28* (2022.01)
*H04L 47/56* (2022.01)

(52) U.S. Cl.
CPC ............ *H04L 47/562* (2013.01); *H04L 47/28* (2013.01)

(58) Field of Classification Search
CPC .............................. H04L 47/562; H04L 47/28
See application file for complete search history.

(56) References Cited

U.S. PATENT DOCUMENTS 9,621,468 B1 * 4/2017 Sorenson, III .......... H04L 43/08
11,343,198 B2 5/2022 Shalev et al.

2007/0005787 A1 1/2007 Igarashi et al.
2007/0064705 A1 3/2007 Tateno et al.
2010/0241919 A1 9/2010 Jeon
2012/0226802 A1 9/2012 Wu et al.
2014/0153574 A1 6/2014 Louzoun et al.
(Continued)

FOREIGN PATENT DOCUMENTS

EP 1105988 11/2012
EP 3487133 5/2019
(Continued)

OTHER PUBLICATIONS

International Search Report and Written Opinion dated Sep. 17, 2024, from International Patent Application No. PCT/US2024/033483, 15 pp.
International Search Report and Written Opinion dated Sep. 5, 2024, for International Patent Application No. PCT/US2024/033474, 17 pp.
(Continued)

*Primary Examiner* — Duyen M Doan
(74) *Attorney, Agent, or Firm* — Klarquist Sparkman, LLP

(57) ABSTRACT

Innovations in packet scheduling, which allow a scheduling mechanism to approximate fine-grained rate adjustments and cycle-granularity inter-packet spacing for packets of a flow, are described herein. For example, in an iteration of a scheduler loop, a sender determines whether a proximity condition is satisfied for the next packet of a flow. The proximity condition depends at least in part on how long a target next send time is after a current time. The next packet is scheduled for transmission if the next packet is due or if the proximity condition is satisfied for the next packet. When the next packet is scheduled for transmission, the sender sends the next packet and updates the target next send time based at least in part on a target transmission rate.

20 Claims, 8 Drawing Sheets

200

(56) References Cited

U.S. PATENT DOCUMENTS

| | | | |
|---|---|---|---|
| 2014/0254351 A1 | 9/2014 | Newman et al. | |
| 2014/0301223 A1 | 10/2014 | Wong et al. | |
| 2015/0281026 A1 | 10/2015 | Thapliya et al. | |
| 2016/0173394 A1* | 6/2016 | Harvell | H04L 69/16 |
| | | | 709/203 |
| 2016/0285767 A1* | 9/2016 | Brandeburg | H04L 47/36 |
| 2021/0203606 A1* | 7/2021 | Burroughs | H04L 47/11 |
| 2021/0399990 A1* | 12/2021 | Wang | H04L 47/12 |
| 2022/0046667 A1 | 2/2022 | Sun et al. | |
| 2022/0086100 A1* | 3/2022 | Biederman | H04L 47/56 |
| 2023/0061794 A1* | 3/2023 | Livne | H04L 47/56 |

FOREIGN PATENT DOCUMENTS

| | | |
|---|---|---|
| EP | 4099649 | 12/2022 |
| WO | WO 2023/011712 | 2/2023 |

OTHER PUBLICATIONS

International Search Report and Written Opinion dated Sep. 19, 2024, from International Patent Application No. PCT/US2024/032184, 12 pp.

Kaspar, "Multipath Aggregation of Heterogeneous Access Networks," Ph.D. Dissertation, University of Oslo, 138 pp. (Dec. 2011).

Office Action dated Jul. 9, 2025, from U.S. Appl. No. 18/210,561, 17 pp.

Communication pursuant to Rules 161(1) and 162 EPC dated Jan. 22, 2026, for European Patent Application No. 24739882.9, 3 pp.

Communication pursuant to Rules 161(1) and 162 EPC dated Jan. 22, 2026, for European Patent Application No. 24737564.5, 3 pp.

Communication pursuant to Rules 161(1) and 162 EPC dated Jan. 29, 2026, for European Patent Application No. 24736930.9, 3 pp.

International Preliminary Report on Patentability dated Dec. 26, 2025, from International Patent Application No. PCT/US2024/033474, 11 pp.

International Preliminary Report on Patentability dated Dec. 26, 2025, from International Patent Application No. PCT/US2024/032184, 6 pp.

International Preliminary Report on Patentability dated Jan. 2, 2026, from International Patent Application No. PCT/US2024/033483, 9 pp.

Notice of Allowance dated Mar. 10, 2026, from U.S. Appl. No. 18/210,561, 5 pp.

Office Action dated Feb. 13, 2026, from U.S. Appl. No. 18/210,573, 28 pp.

\* cited by examiner logic or software 141 implementing one or more innovations
for packet scheduling that approximates fine-grained rate
adjustments and cycle-granularity inter-packet spacing

FIG. 2        200 from application layer: | data 210 (e.g., message) |

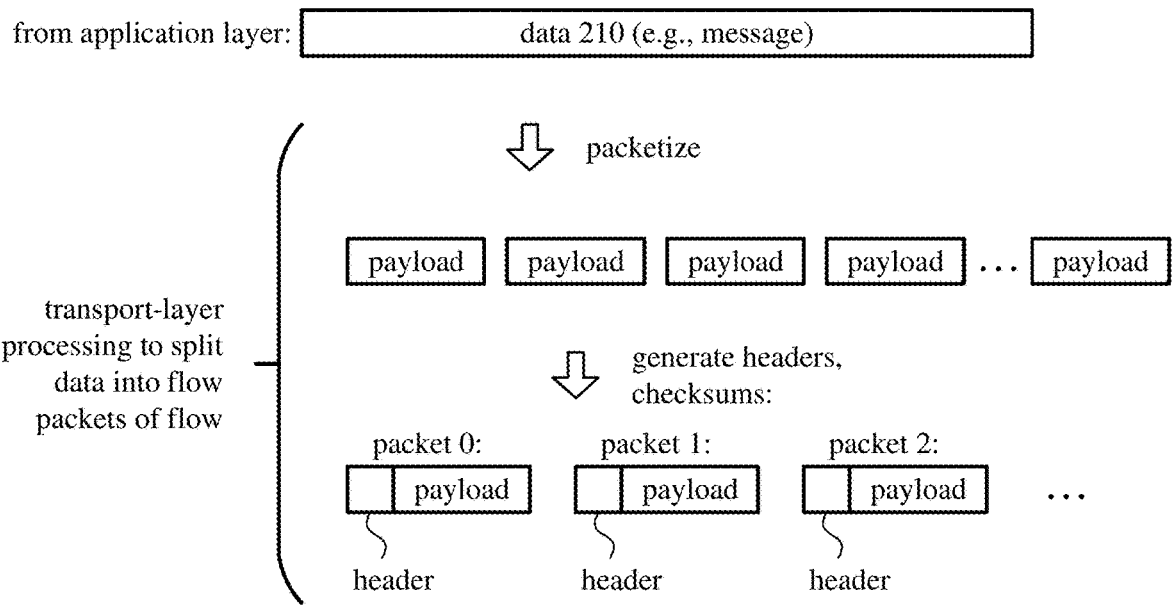

transport-layer
processing to split
data into flow
packets of flow packetize payload    payload    payload    payload  . . .  payload generate headers,
checksums:

packet 0:                packet 1:                packet 2:

payload                payload                payload      . . .

header                 header                 header

FIG. 3        300

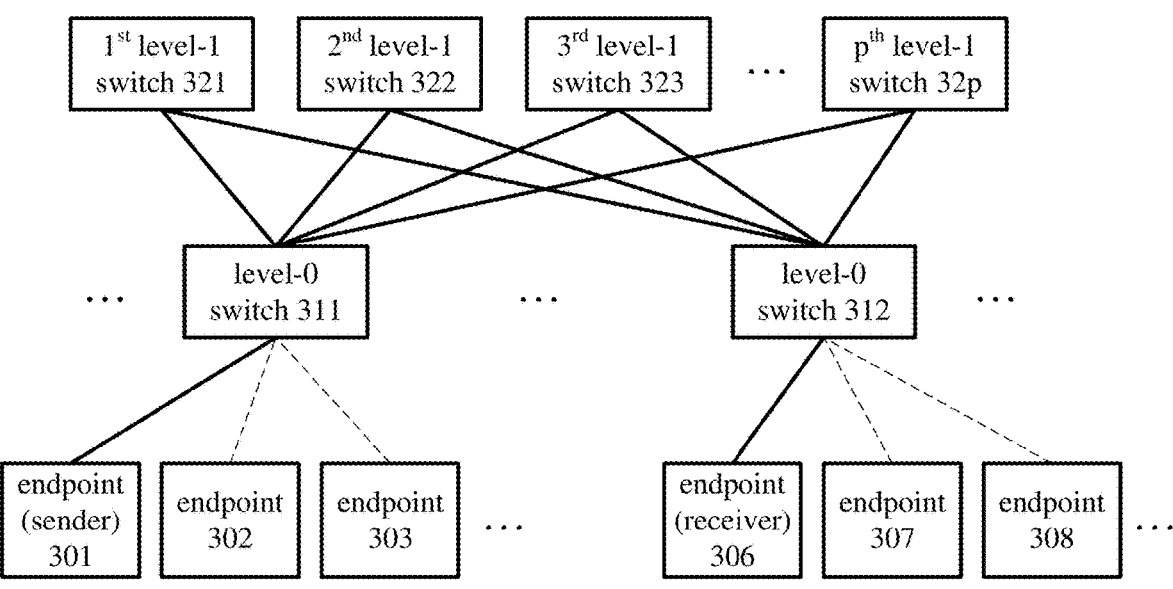

| 1st level-1 switch 321 | 2nd level-1 switch 322 | 3rd level-1 switch 323 | . . . | pth level-1 switch 32p | level-0 switch 311      . . .      level-0 switch 312 endpoint (sender) 301 | endpoint 302 | endpoint 303 | . . . | endpoint (receiver) 306 | endpoint 307 | endpoint 308 | . . .

FIG. 6      <u>600</u>

```
// When can the packet be sent?
//    1. If next_send_time is smaller than current_time,
//       a packet of the flow is due to be sent, so transmit it
//    2. If newly added flow, send the first frame right away
//    3. If next_send_time is greater than current_time but within
//       iteration window of while(true) loop then probabilistically
//       send the packet (lfsr comparison)

lfsr_seq = urandom_range(0, iteration_window);
current_time = cycles();
throttle_compare = (flow.next_send_time - current_time)
bool ready_to_send = (msb(throttle_compare) == 1 ||
        flow.newly_added);

if (ready_to_send || (throttle_compare < lfsr_seq)))
{
    flow.newly_added = true;
    transmit_now = true;
}
if (transmit_now)
{
    send_packet(packet);
    flow.next_send_time = cycles() + throttle_gap;
    flow.newly_added = false;
}
```

FIG. 7       <u>700</u>

```
// When can the packet be sent?
//    1. If next_send_time is smaller than current_time,
//        a packet of the flow is due to be sent, so transmit it
//    2. If newly added flow, send the first frame right away
//    3. If next_send_time is greater than current_time but within
//        iteration window of while(true) loop then send the packet
//        and increase next send time by that margin current_time = cycles();
throttle_compare = (flow.next_send_time - current_time)
bool ready_to_send = (msb(throttle_compare) == 1 ||
        flow.newly_added);
ipg_comp = ready_to_send ? 0 : throttle_compare;

if (ready_to_send || (throttle_compare < iteration_window))
{
    flow.newly_added = true;
    transmit_now = true;
} if (transmit_now)
{
    send_packet(packet);
    flow.next_send_time = cycles() + throttle_gap + ipg_comp
    flow.newly_added = false;
}
```

Figure 8:
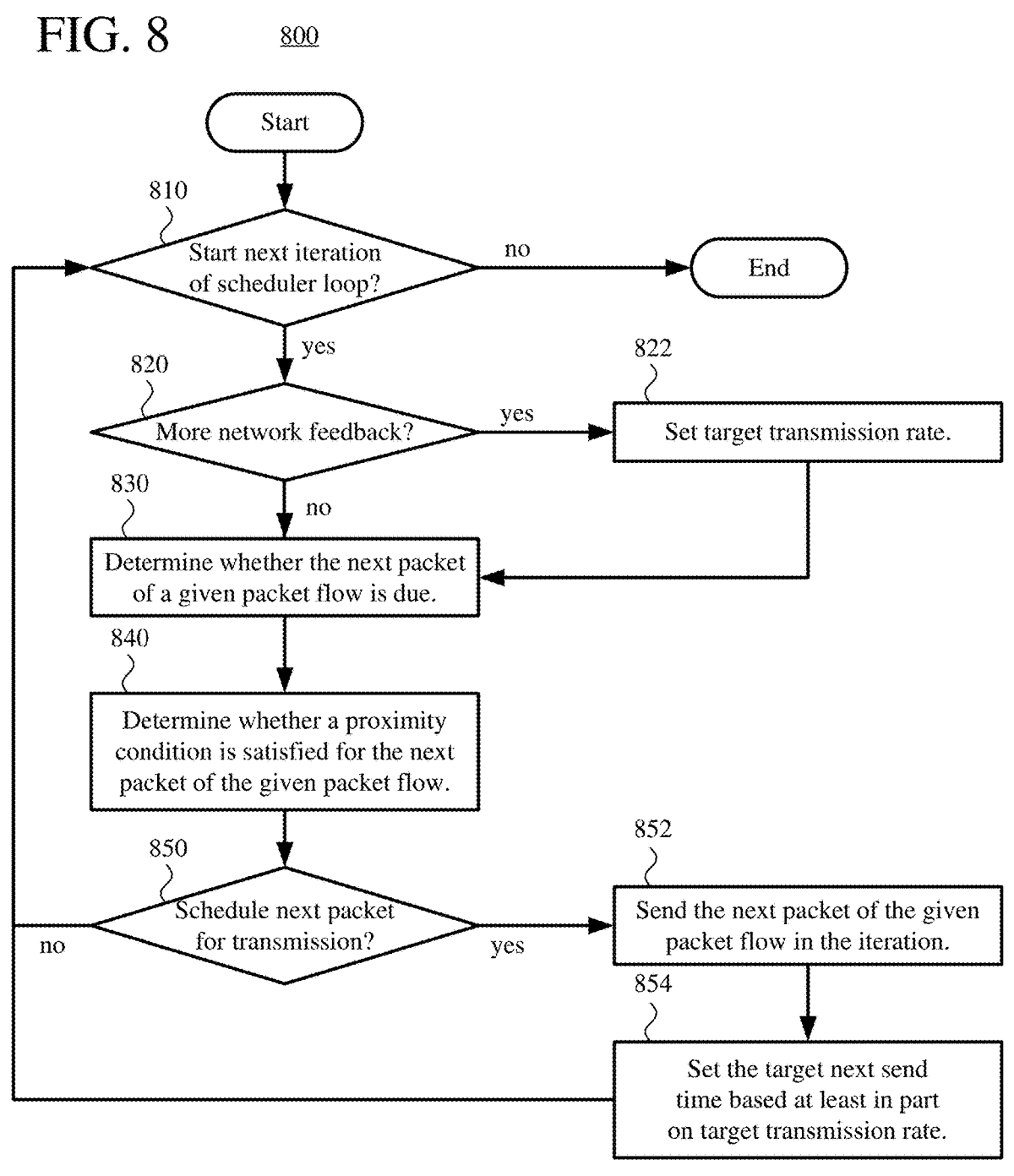

FIG. 8    800

```
                    ┌──────────┐
                    │  Start   │
                    └──────────┘
                         │
   810                   ▼
        ╱──────────────────────────╲        no        ┌──────────┐
       ╱   Start next iteration      ╲──────────────→ │   End    │
       ╲   of scheduler loop?        ╱                 └──────────┘
        ╲──────────────────────────╱
                    │ yes
   820              ▼                                    822
        ╱────────────────────────╲   yes       ┌──────────────────────────────┐
       ╱  More network feedback?   ╲─────────→ │  Set target transmission     │
       ╲                           ╱           │  rate.                       │
        ╲────────────────────────╱             └──────────────────────────────┘
   830              │ no                                 │
                    ▼                                    │
       ┌────────────────────────────┐ ◄─────────────────┘
       │ Determine whether the next │
       │ packet of a given packet   │
       │ flow is due.               │
       └────────────────────────────┘
   840              │
                    ▼
       ┌────────────────────────────┐
       │ Determine whether a        │
       │ proximity condition is     │
       │ satisfied for the next     │
       │ packet of the given packet │
       │ flow.                      │
       └────────────────────────────┘
   850              │                          852
                    ▼                           ┌──────────────────────────────┐
        ╱────────────────────────╲   yes        │ Send the next packet of the  │
       ╱  Schedule next packet     ╲──────────→ │ given packet flow in the     │
       ╲  for transmission?        ╱            │ iteration.                   │
        ╲────────────────────────╱              └──────────────────────────────┘
   no      │                          854                │
                                       ┌──────────────────────────────┐
                                       │ Set the target next send     │
                                       │ time based at least in part  │
                                       │ on target transmission rate. │
                                       └──────────────────────────────┘
```

900

FIG. 10    <u>1000</u>
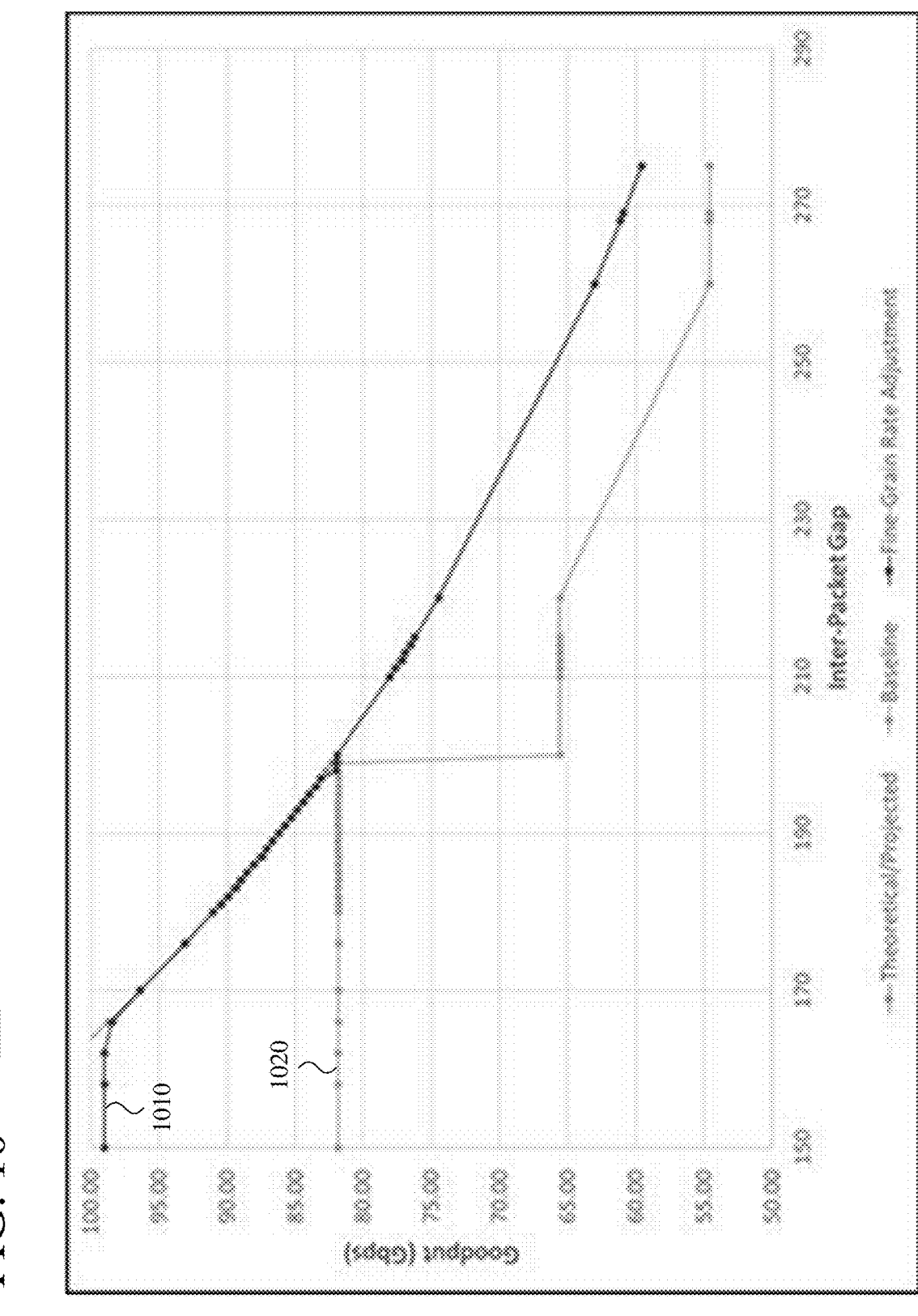

SCHEDULING MECHANISMS FOR APPROXIMATING FINE-GRAINED, PER-FLOW RATE ADJUSTMENTS AND CYCLE-GRANULARITY INTER-PACKET SPACING IN NETWORK APPLICATIONS

COPYRIGHT NOTICE

BACKGROUND

In computer networking, a transport protocol is a set of rules and procedures that govern the exchange of data between computing devices over a computer network. Typically, one of the computing devices, acting as a sender, breaks data such as a message or file into smaller units called packets. The sender sends the packets over the computer network to another computing device, which has the role of a receiver and can recreate the data from information in the packets.

A transport protocol interoperates with network protocols at other layers. For example, an implementation of a transport layer receives data such as a message or file from an implementation of an application layer, presentation layer, or session layer. The implementation of the transport layer provides transport-layer packets for the data to an implementation of a network layer, which can implement a version of Internet Protocol ("IP"). Depending on the transport protocol, transport-layer processing can provide features such as error detection, retransmission of dropped transport-layer packets, control over the rate that transport-layer packets are transmitted (sometimes called flow control), and sequencing of transport-layer packets. Transmission control protocol ("TCP") and user datagram protocol ("UDP") are two examples of transport protocols.

A reliable transport protocol uses mechanisms to guarantee, or at least take steps to guarantee, the delivery of transport-layer packets from the sender to the receiver. Such mechanisms can include error detection, retransmission of dropped packets, and flow control. TCP is an example of a reliable transport protocol. The mechanisms that provide for reliable delivery of transport-layer packets can add delay to detect and retransmit dropped packets, which may be significant if many transport-layer packets are dropped. UDP is an example of an unreliable transport protocol. UDP can provide more timely delivery of transport-layer packets, without the overhead of reliability mechanisms but also without the attempts to guarantee delivery.

Transport-layer packets may be delayed for various reasons. For example, a switch may be temporarily busy, causing delay in delivery of packets through that switch. In extreme cases, a packet may be dropped due to congestion at a switch. Rarely, bits of a packet may suffer from bit flips due to interference, an unreliable link, or another cause, resulting in the packet being dropped when loss of information is detected. A sender can retransmit a dropped packet.

In a transport protocol, flow control can help avoid congestion and packet loss. In general, window-based flow control is one approach to flow control. Rate-based flow control is another approach.

In window-based flow control, a sender adjusts the size of a window for transmission of packets. For example, window-based flow control is implemented using a sliding window mechanism. The sender maintains a sliding window, which defines a range of packets the sender can send. The sender starts sending packets of a flow within its sliding window and waits for acknowledgement ("ACK") packets from the receiver. The receiver also maintains a sliding window, which defines a range of packets the receiver can receive. As the receiver receives packets of a flow, the receiver sends ACK packets back to the sender to acknowledge receipt of the respective packets of the flow. As the sender receives ACK packets from the receiver, the sender can move its sliding window. If the sender receives an ACK packet for a packet of a flow, the sender can move its window forward, indicating the previous packets of the flow have been successfully received. On the other hand, if the sender does not timely receive an ACK packet for a packet of a flow, the sender eventually assumes the packet was lost and retransmits the packet of the flow. The sender and receiver can negotiate the initial size of the sliding windows, and the size of the sliding windows can be dynamically adjusted (e.g., using a smaller window size after a retransmission or for a slow start, then increasing the window size). In window-based flow control, the transmission rate of packets transmitted by the sender is indirectly affected by adjusting window size.

In contrast, in rate-based flow control, the transmission rate of packets that are transmitted by a sender is directly regulated. The transmission rate can be specified as an inter-packet gap value (sometimes called an inter-packet spacing value), which indicates an amount of spacing between consecutive packets, e.g., as a difference between the start times for transmission of the consecutive packets. A sender can adapt to network conditions by regulating the transmission rate. The sender can react to congestion or packet losses by decreasing the transmission rate. Or, the sender can increase the transmission rate in response to positive feedback about network conditions. When rate-based flow control is used, the sender and receiver can also maintain sliding windows to track which packets have been delivered and identify packets for retransmission.

In some implementations of rate-based flow control, transmission rate cannot be effectively regulated in a fine-grained way (e.g., with inter-packet spacing at the level of individual cycles of a transport-layer scheduling mechanism). In particular, a transport-layer scheduling mechanism may include operations in a scheduler loop whose duration is variable and coarse-grained (e.g., at the scale of tens or hundreds of cycles). Moreover, the scheduler loop may iterate over multiple active flows of packets, potentially sending packets from any of the multiple flows. These factors typically prevent the scheduling mechanism from sending a next packet of a particular flow at a specific cycle that exactly fits the inter-packet spacing for an arbitrary transmission rate. As such, in many scenarios, the sender cannot effectively regulate the flow of packets using fine-grained adjustments to transmission rate.

SUMMARY

In summary, the detailed description presents innovations in packet scheduling, which can allow a scheduling mechanism to approximate fine-grained rate adjustments and cycle-granularity inter-packet spacing for packets of a flow. In some example implementations, a sender can specify cycle-granularity inter-packet spacing. A scheduling mechanism includes operations to schedule packets for transmission in a way that approximates the specified inter-packet spacing. This allows the sender to effectively regulate transmission rate in a fine-grained way. Also, in some example implementations, inter-packet spacing can be specified on a per-flow basis, which allows the sender to set different transmission rates for different packet flows.

According to some techniques and tools described herein, packets of a given packet flow are scheduled for transmission. In a scheduler loop for packet scheduling (e.g., as part of a transport-layer scheduling mechanism), a sender processes the given packet flow. The sender can process multiple packet flows, including the given packet flow, in the scheduler loop, in which case the sender performs operations in the scheduler loop for the multiple packet flows, which can have different transmission rates.

In particular, in an iteration of the scheduler loop, the sender can determine whether a next packet of the given packet flow is due. For example, the next packet is due if a target next send time is earlier than a current time. Or, as another example, the next packet is due if the given packet flow was newly added.

In some cases, the next packet of the given packet flow is not due. In the iteration of the scheduler loop, the sender determines whether a proximity condition is satisfied for the next packet of the given packet flow. The proximity condition depends at least in part on how long the target next send time is after the current time. In general, if the target next send time (although later than the current time) is close enough to the current time, the proximity condition is satisfied and the next packet can be scheduled for transmission. For example, the sender determines a difference between the target next send time and the current time. The sender also determines a threshold value, which depends on an estimate of iteration duration for the scheduler loop. The threshold value can be calculated in different ways, depending on implementation. The sender compares the difference to the threshold value. Satisfaction of the proximity condition depends on a result of the comparison of the difference to the threshold value.

The sender determines whether to schedule the next packet of the given packet flow for transmission. The next packet is scheduled for transmission if the next packet is due or if the proximity condition is satisfied for the next packet. When the next packet of the given packet flow is scheduled for transmission, the sender sends the next packet and updates the target next send time based at least in part on a target transmission rate. The target transmission rate can be a per-flow target inter-packet gap ("IPG") value associated with the given packet flow. If so, different active packet flows can have different target IPG values.

The sender can dynamically adjust the target transmission rate. For example, when the sender receives network feedback, the sender can set the target transmission rate based at least in part on the network feedback.

For a first approach to approximating fine-grained rate adjustments, the sender sends some packets of the given packet flow early, and the sender sends other packets of the given packet flow late, but packets of the given packet flow are transmitted with spacing at a target IPG value on average. According to the first approach, when the next packet of the given packet flow is not due, the sender probabilistically determines whether to send the next packet of the given packet flow in an iteration. In particular, to determine the threshold value for the proximity condition, the sender determines a random number between 0 and the estimate of iteration duration for the scheduler loop, then sets the threshold value to the random number. When updating the target next send time, the sender determines a transmission time and adds the target IPG value to the transmission time.

For a second approach to approximating fine-grained rate adjustments, the sender may send a packet of the given packet flow early but, if so, adjusts the target next send time of the following packet to compensate for the early transmission. Packets of the given packet flow are transmitted with spacing at a target IPG value on average. According to the second approach, to determine the threshold value for the proximity condition, the sender sets the threshold value as the estimate of the iteration duration for the scheduler loop. When updating the target next send time, the sender determines a transmission time and also determines if the difference between the target next send time and the current time is greater than zero. If so, the sender combines the transmission time, the target IPG value, and the difference. Otherwise, the sender adds the target IPG value to the transmission time. Thus, the updated target next send time is equal to the transmission time plus the target IPG value plus, if the difference is greater than zero, the difference.

In some example implementations, using the first approach or second approach, the sender can make fine-grained rate adjustments and set cycle-granularity target IPG values for packets of a packet flow. The scheduling mechanism then schedules the packets for transmission in a way that approximates the fine-grained rate adjustments and cycle-granularity target IPG values.

The innovations described herein can be implemented as part of a method, as part of a computer system (physical or virtual, as described below) or network interface device configured to perform the method, or as part of a tangible computer-readable media storing computer-executable instructions for causing one or more processors, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 2 is a diagram of example transport-layer processing in conjunction with which some described embodiments can be implemented.

FIG. 3 is a diagram of an example network in which some described embodiments can be implemented.

FIGS. 6 and 7 are code fragments for a first approach and a second approach, respectively, for approximating fine-grained rate adjustments and cycle-granularity inter-packet spacing.

FIG. 8 is a flowchart that illustrates a generalized approach to packet scheduling that approximates fine-grained rate adjustments and cycle-granularity inter-packet spacing.

FIG. 10 is a chart that shows effective throughput for different IPG values according to two different transport-layer scheduling mechanisms.

DETAILED DESCRIPTION

Figure 1:
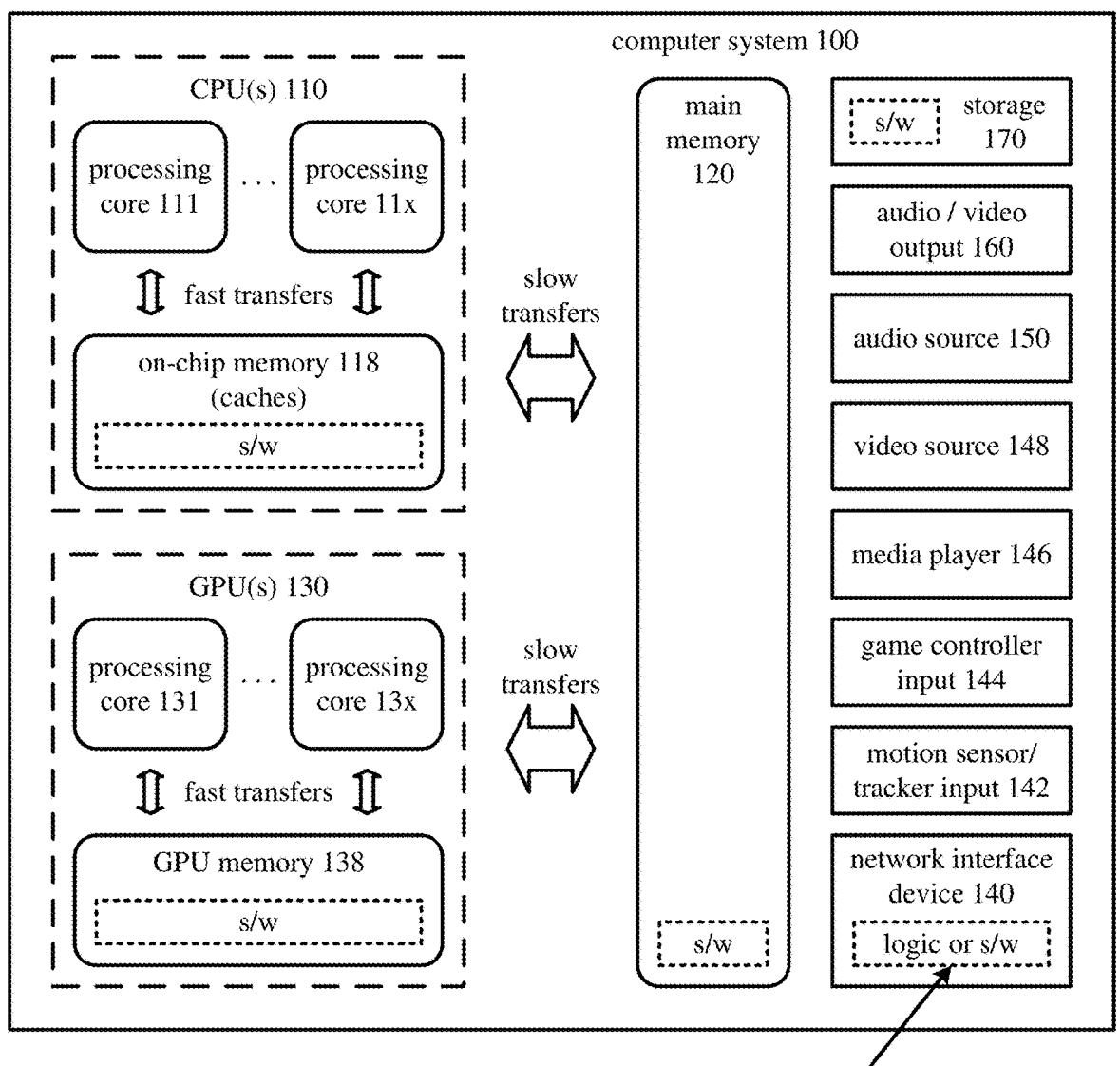
FIG. 1 is a diagram illustrating an example computer system in which some described embodiments can be implemented.

The detailed description presents innovations in packet scheduling, which allow a scheduling mechanism to approximate fine-grained rate adjustments and cycle-granularity inter-packet spacing for packets of a flow. In some example implementations, iterations of a scheduler loop of a transport-layer scheduling mechanism have a duration that is variable and coarse-grained. Even so, a sender can specify a cycle-granularity inter-packet spacing. The scheduling mechanism includes operations to schedule packets for transmission in a way that approximates the specified inter-packet spacing. This allows the sender to effectively regulate transmission rate in a fine-grained way. In some example implementations, inter-packet spacing can be specified on a per-flow basis, which allows the sender to set different transmission rates for different packet flows.

For example, in a scheduler loop, a sender processes a given packet flow. In particular, in an iteration of the scheduler loop, the sender can determine whether the next packet of the given packet flow is due (e.g., because the given packet flow was newly added, or because a target next send time is earlier than a current time). In some cases, the next packet of the given packet flow is not due, and the sender determines whether a proximity condition is satisfied for the next packet of the given packet flow. The proximity condition depends at least in part on how long the target next send time is after the current time. The next packet is scheduled for transmission if the next packet is due or if the proximity condition is satisfied for the next packet. When the next packet of the given packet flow is scheduled for transmission, the sender sends the next packet and updates the target next send time based at least in part on a target transmission rate, e.g., target inter-packet gap value. In this way, the scheduling mechanism can schedule packets for transmission in a way that approximates fine-grained rate adjustments and cycle-granularity inter-packet spacing.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure. The following description is, therefore, not to be taken in a limited sense.

I. Example Computer Systems

FIG. 1 illustrates a generalized example of a suitable computer system (100) in which several of the described innovations may be implemented. The innovations described herein relate to packet scheduling that approximates fine-grained rate adjustments and cycle-granularity inter-packet spacing. The computer system (100) is not intended to suggest any limitation as to scope of use or functionality, as the innovations may be implemented in diverse computer systems, including special-purpose computer systems.

With reference to FIG. 1, the computer system (100) includes one or more processing cores (110 . . . 11x) and local memory (118) of a central processing unit ("CPU") or multiple CPUs. The processing core(s) (110 . . . 11x) are, for example, processing cores on a single chip, and execute computer-executable instructions. The number of processing core(s) (110 . . . 11x) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) (110 . . . 11x). Alternatively, the processing cores (110 . . . 11x) can be part of a system-on-a-chip ("SoC"), application-specific integrated circuit ("ASIC"), or other integrated circuit. In FIG. 1, the local memory (118) is on-chip memory such as one or more caches, for which access operations, transfer operations, etc. with the processing core(s) (110 . . . 11x) are fast.

The computer system (100) also includes processing cores (130 . . . 13x) and local memory (138) of a graphics processing unit ("GPU") or multiple GPUs. The number of processing cores (130 . . . 13x) of the GPU depends on implementation. The processing cores (130 . . . 13x) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The GPU memory (138) may be volatile memory (e.g., registers, cache, RAM), non-volatile memory (e.g., ROM, EEPROM, flash memory, etc.), or some combination of the two, accessible by the respective processing cores (130 . . . 13x).

The computer system (100) includes main memory (120), which may be volatile memory (e.g., RAM), non-volatile memory (e.g., ROM, EEPROM, flash memory, etc.), or some combination of the two, accessible by the processing core(s) (110 . . . 11x, 130 . . . 13x). In FIG. 1, the main memory (120) is off-chip memory, for which access operations, transfer operations, etc. with the processing cores (110 . . . 11x, 130 . . . 13x) are slower.

More generally, the term "processor" may refer generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA").

The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (100) includes one or more network interface devices (140) such as network interface cards ("NICs"). The network interface device(s) (140) enable communication over a network to another computing entity (e.g., server, other computer system). In some example implementations, the network interface device(s) (140) support wired connections for a network of high-performance computers. In practice, the network may include thousands, tens of thousands, or even more network interface devices. Examples of networks are described below with reference to FIG. 3. Alternatively, the network interface device(s) (140) can support wired connections and/or wireless connections for a wide-area network, local-area network, personal-area network or other network. For example, the network interface device(s) can include one or more Wi-Fi transceivers, an Ethernet port, a cellular transceiver and/or another type of network interface device, along with associated drivers, software, etc.

The network interface device(s) (140) implement logic or software (141) for packet scheduling that approximates fine-grained rate adjustments and cycle-granularity inter-packet spacing. For example, one of the network interface device(s) (140) is implemented using an FPGA that provides logic for packet scheduling that approximates fine-grained rate adjustments and cycle-granularity inter-packet spacing. Alternatively, one of the network interface device(s) (140) includes memory that stores software implementing aspects of the packet scheduling that approximates fine-grained rate adjustments and cycle-granularity inter-packet spacing, in the form of firmware or other computer-executable instructions for an FPGA, ASIC, or other processor of the network interface device.

The network interface device(s) (140) convey information such as computer-executable instructions, arbitrary data from an application, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (100) optionally includes a motion sensor/tracker input (142) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorporate gesture recognition, facial recognition and/or voice recognition.

The computer system (100) optionally includes a game controller input (144), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (146) and video source (148). The media player (146) can play DVDs, Blu-ray discs, other disc media and/or other formats of media. The video source (148) can be a camera input that accepts video input in analog or digital form from a video camera, which captures natural video. Or, the video source (148) can be a screen capture module (e.g., a driver of an operating system, or software that interfaces with an operating system) that provides screen capture content as input. Or, the video source (148) can be a graphics engine that provides texture data for graphics in a computer-represented environment. Or, the video source (148) can be a video card, TV tuner card, or other video input that accepts input video in analog or digital form (e.g., from a cable input, HDMI input or other input).

An optional audio source (150) accepts audio input in analog or digital form from a microphone, which captures audio, or other audio input.

The computer system (100) optionally includes a video output (160), which provides video output to a display device. The video output (160) can be an HDMI output or other type of output. An optional audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100).

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," "including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Example Transport Protocols

Innovations described herein relate to a transport protocol. In general, a transport protocol is a set of rules and procedures that govern the exchange of data between computing devices over a computer network. Typically, a sender breaks data such as a message or file into smaller units called packets. The sender sends the packets over the computer network to a receiver, which can recreate the data from information in the packets. As used herein, the terms "sender" and "receiver" indicate roles for transmission and reception, respectively, of packets for a flow. Depending on the transport protocol, the receiver may send feedback (e.g., as acknowledgement packets) to the sender. Also, in many cases, a computing device acts as a sender for one packet flow and as a receiver for a different packet flow.

A transport protocol interoperates with network protocols at other layers. For example, an implementation of a transport layer (transport-layer implementation or transport-layer processing) receives data such as a message or file from an implementation of an application layer, presentation layer, or session layer. The transport-layer processing provides transport-layer packets for the data to an implementation of a network layer, which can implement a version of Internet Protocol ("IP"). Depending on the transport protocol, transport-layer processing can provide features such as error detection, retransmission of dropped transport-layer packets, control over the rate that transport-layer packets are transmitted (sometimes called flow control), and sequencing of transport-layer packets. Transmission control protocol ("TCP") and user datagram protocol ("UDP") are two examples of transport protocols.

A reliable transport protocol uses mechanisms to guarantee, or at least take steps to guarantee, the delivery of transport-layer packets from the sender to the receiver. Such mechanisms can include error detection, retransmission of dropped packets, and flow control. TCP is an example of a reliable transport protocol. The mechanisms that provide for reliable delivery of transport-layer packets can add delay to detect and retransmit dropped packets, which may be significant if many transport-layer packets are dropped. UDP is an example of an unreliable transport protocol. UDP can provide more timely delivery of transport-layer packets, without the overhead of reliability mechanisms but also without the operations to guarantee delivery.

In some example implementations, transport-layer processing implements a lightweight, reliable, message-based transport protocol. The transport-layer processing adds flow control mechanisms, as described herein, on top of UDP and uses IP routing. Alternatively, innovations described herein can be used in conjunction with another transport protocol.

FIG. 2 shows example transport-layer processing (200) in conjunction with which some described embodiments can be implemented. An application-layer entity provides data (210) such as a message or file to a sender for transport-layer processing. In some example implementations, the data (210) is a remote direct memory access ("RDMA") message, for which data is delivered directly into memory of the receiver upon receipt. An address offset in memory can be included in the payload or header. Alternatively, the data (210) is another type of data.

At the sender, transport-layer processing splits the data (210) into transport-layer flow packets of a flow. In particular, the transport-layer processing packetizes the data (210) into multiple payloads for flow packets of a flow. The payloads can have a uniform size, as shown in FIG. 2, or different sizes. The transport-layer processing generates headers for the respective packets, which are ordered by packet sequence number ("PSN") in a packet sequence. A given transport-layer packet includes a header followed by one of the payloads. The header can include various fields. Typically, the header includes fields that indicate a source port of the sender, a destination port of the receiver, a PSN, and a length of the header or the entire transport-layer packet, depending on the protocol. One or more flag bits (also called control bits) of the header can indicate the type of the packet or attributes of the packet. Typically, the header also includes a checksum for the transport-layer packet. The checksum can be computed by applying a checksum function (e.g., XOR, one's complement sum, or hash function) to the data subjected to the checksum, which may include the header, the payload, and other header information (e.g., for IP routing). A receiver can use the checksum to detect errors introduced in transmission.

The sender transmits the respective packets of the flow over a network to the receiver. In typical configurations, traffic for the flow is bursty—there can be intensive traffic for the flow over a short period of time, followed by a long period time with no traffic for the flow. To transmit a burst of flow packets for the flow, the sender can transmit the packets, one after another, with the start of a given packet being separated from the start of a next packet by an inter-packet gap ("IPG") value (also called an inter-packet spacing value). The IPG value need not be exactly the same between all flow packets. The burst is followed by an idle interval.

III. Example Networks

FIG. 3 shows an example network (300) in which some described embodiments can be implemented. The example network (300) includes multiple endpoints (301 . . . 308) and multiple network switches (311, 312, 321 . . . 32p). The network switches are hierarchically organized as level-0 switches (311, 312) and level-1 switches (321 . . . 32p). Each of the level-0 switches (311, 312) connects through dedicated links to some of the respective endpoints (301 . . . 308). The dedicated links between the level-0 (311, 312) switches and the endpoints (301 . . . 308) are, for example, high-speed, high-bandwidth wired connections. Each level-0 switch (311, 312) can be connected to 4, 8, 16, or some other number of endpoints. Each level-0 switch (311, 312) also connects through a dedicated link to each level-1 switch (321 . . . 32p). The network (300) can include 8, 16, 32, or some other number of level-1 switches (321 . . . 32p). For example, the first level-0 switch (311) has a first dedicated link to the first level-1 switch (321), a second dedicated link to the second level-1 switch (322), a third dedicated link to the third level-1 switch (323), and so on. The dedicated links between the level-0 (311, 312) switches and the level-1 switches (321 . . . 32p) are, for example, high-speed, high-bandwidth wired connections.

In FIG. 3, one of the endpoints (301) has the role of sender for a packet flow, and another endpoint (306) has the role of receiver for the packet flow. In practice, each of the endpoints (301 . . . 308) can act as both a receiver and a sender through a network interface device at that endpoint.

The example network (300) is used for multi-path delivery of packets. Transport-layer packets of a flow from a given sender, which may be encapsulated as IP packets, travel across any and all of multiple paths through the network (300) to reach a given receiver. For example, transport-layer packets of a flow from the sender at one endpoint (301) travel across p different paths to the receiver at another endpoint (306). The transport-layer packets pass through the first level-0 switch (311), which distributes the transport-layer packets across the p different level-1 switches (321 . . . 32p) for the p different paths, and through the second level-0 switch (312) to reach the receiver at the other endpoint (306). The transport-layer packets can be routed along different paths through the network (300), for example, by adjusting bits of the destination port field in the headers of the respective packet. The header bits for the destination port field in the header of a given packet can control which path is used for the given packet. The header bits for the respective packets can be adjusted according to results from a hash function, so as to cause different packets to "spray" across the different paths. Or, the header bits can be rotated according to a pattern, so as to cause the packets to be routed on different paths according to the pattern. Traffic between any given combination of sender and receiver can be bursty—there can be intensive traffic for a short period of time, followed by a long period of time with no traffic. By delivering transport-layer packets of a flow along multiple paths of the network (300), the available bandwidth of the network (300) can be more consistently and evenly used.

In some example implementations, the paths in the network (300) are symmetric. The paths have the same length in terms of number of hops through the network (300), the same latency, and the same throughput, at least for paths between endpoints connected to different level-0 switches. Alternatively, the paths in the network (300) are asymmetric. That is, the paths through the network (300) can have different lengths in terms of different numbers of hops through the network (300), different latency, and/or different throughput.

Even in a network with symmetric paths used for multi-path delivery, the amount of delay on different paths can vary. A switch may be temporarily busy, causing delay in delivery of packets through that switch. Because of different delays along different paths, packets can be received by a receiver in an order different than the order the packets were sent by a sender. In extreme cases, a packet may be dropped due to congestion at a switch. Rarely, bits of a packet may suffer from bit flips due to interference, an unreliable link, or another cause, resulting in the packet being dropped when loss of information is detected. A sender can retransmit a dropped packet.

Innovations described herein can be used for flow control in conjunction with multi-path delivery of packets over a network. Alternatively, innovations described herein can be used for flow control in conjunction with single-path delivery of packets over a network, in which all transport-layer packets of a flow are delivered along a single path between a sender and a receiver.

IV. Example Rate-based Flow Control Mechanisms

In a transport protocol, flow control can help avoid congestion and packet loss. In window-based flow control, the transmission rate of packets transmitted by a sender is indirectly affected by adjusting window size. In contrast, in rate-based flow control, the transmission rate of packets that are transmitted by a sender is directly regulated.

The transmission rate can be specified in various ways. In some example implementations, the transmission rate for rate-based flow control is specified as an inter-packet gap ("IPG") value, which is sometimes called an inter-packet spacing value. The IPG value indicates an amount of spacing between consecutive packets, for example, as a time difference between the start times for transmission of the consecutive packets. A sender can adapt to network conditions by regulating the IPG value. For example, the sender can react to network congestion or packet losses by increasing the IPG value, thereby decreasing the transmission rate. Or, in response to positive feedback about network conditions or the absence of negative feedback about network conditions, the sender can decrease the IPG value, thereby increasing the transmission rate.

When rate-based flow control is used, the sender and receiver can maintain sliding windows to track which packets have been delivered and identify packets for retransmission. In addition, the sender monitors the network for feedback about network conditions. The sender can infer the existence of network congestion from implicit feedback from a receiver or other entity about network conditions, such as packet losses, packet delays, or increased round trip times ("RTTs"). The sender can also receive explicit feedback about network conditions from a network router or other entity.

Ideally, a sender is able to regulate transmission rate in a fine-grained way in order to react to small changes in network conditions. For example, the sender is able to adjust a per-flow IPG value at the level of individual cycles, schedule packets for transmission at precise cycles consistent with the per-flow IPG value, and then transmit packets at the exact cycles according to the ideal scheduling.

In practice, several complications can make it difficult to regulate transmission rate in a fine-grained way. The primary complication relates to the granularity of operations. In some implementations, operations to schedule packets and adjust transmission rate are performed as part of a scheduler loop that iterates at the scale of tens or hundreds of cycles. When a target transmission rate is specified in a fine-grained way (e.g., at the precision of a single cycle for a cycle-granularity IPG value), the iterations of the scheduler loop are much more coarse-grained in comparison. In some example implementations, a scheduler loop iterates (as long as a "while(true)" condition is satisfied) over multiple stages for a transport-layer scheduling mechanism. Each iteration includes a stage for accepting new messages, a stage for processing acknowledgement metadata such as ACK packets and selective ACK ("SACK") information and checking fast retransmission conditions, a stage for bookkeeping tasks, a stage for scheduling and transmitting packets, and a stage for updating state. A typical iteration of the scheduler loop takes 50 cycles, but packets can only be transmitted during part of the pipeline of the scheduler loop. A packet cannot be scheduled for transmission at any arbitrary cycle of the pipeline. As a result, arbitrary fine-grained cycle-level IPG values are challenging to implement. It may be possible to schedule packets precisely according to an IPG value that is a multiple of the typical iteration duration (e.g., for 50-cycle iterations of a scheduler loop, sending packets every 150 cycles, 200 cycles, or 250 cycles), but precisely scheduling packets according to other IPG values is not possible.

Another complication is that the duration of iterations of the scheduler loop may be variable. In some example implementations, some stages of a scheduler loop (e.g., a stage for bookkeeping tasks) have conditional paths that are rarely followed but add significant delay when they are followed. Even if a typical iteration of the scheduler loop takes 50 cycles, other iterations take as many as 95 cycles. The variability of iteration duration makes it even more challenging to precisely schedule packets according to an arbitrary cycle-granularity IPG value.

Figures 4, 5:
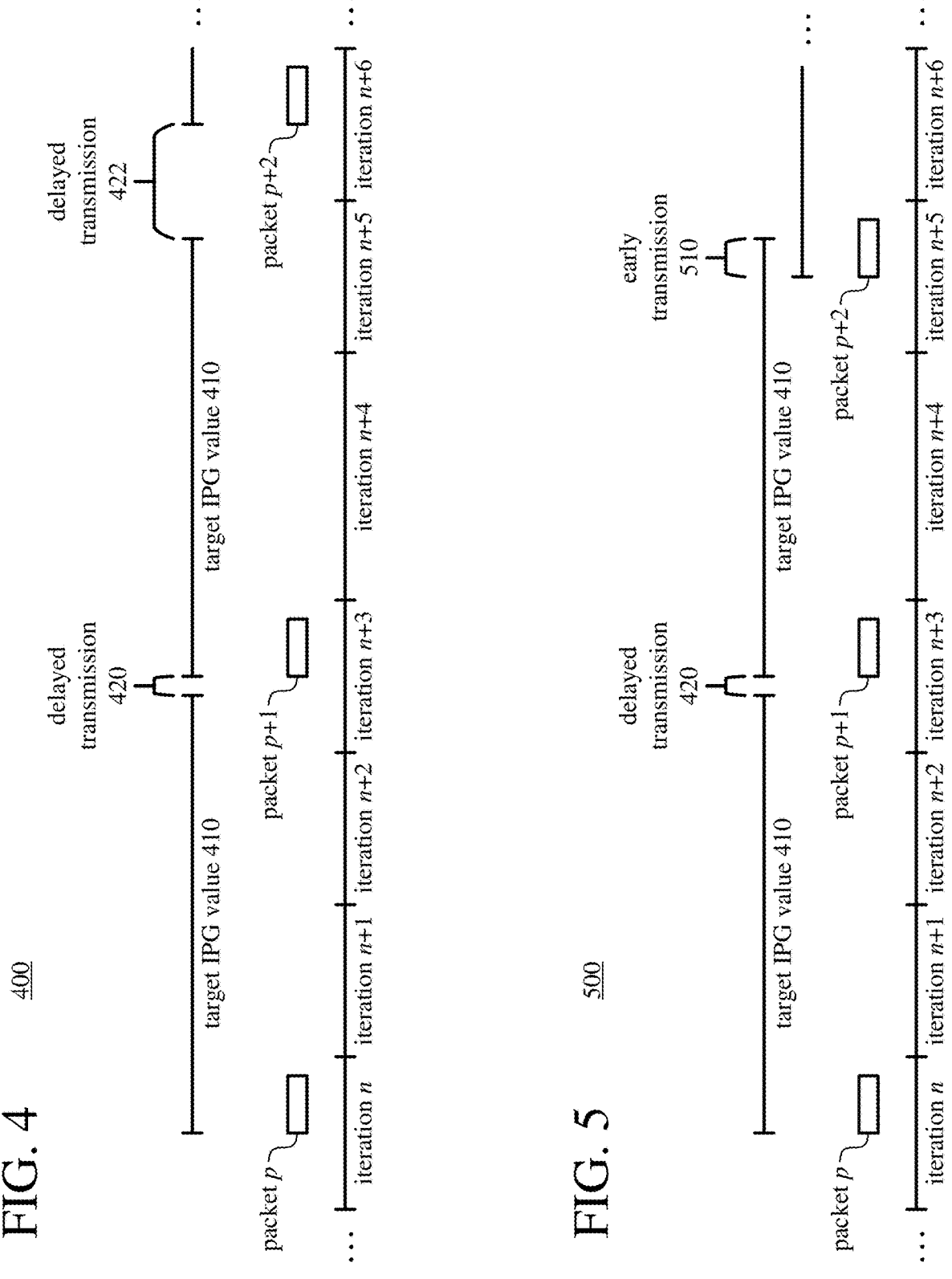
FIG. 4 is a diagram that illustrates packet spacing according to a transport-layer scheduler loop having an iteration duration that is variable and coarse-grained.
FIG. 5 is a diagram that illustrates packet spacing according to scheduling that approximates fine-grained rate adjustments and cycle-granularity inter-packet spacing.

FIG. 4 shows an example (400) of packet spacing according to a transport-layer scheduler loop having an iteration duration that is variable and coarse-grained. A target IPG value (410) specifies a cycle-granularity spacing between packets. Most of the iterations of the scheduler loop have an iteration duration that is the same (e.g., 50 cycles). The target IPG value (410) is not an integer multiple of the typical iteration duration, however, and a packet cannot be transmitted at any arbitrary cycle within an iteration. As a result, packet p+1 is not transmitted at the exact cycle following the target IPG value (410) after the start of transmission of the first packet p. Instead, the packet p+1 is transmitted late, after a delay for delayed transmission (420). For different target IPG values, the extent of delayed transmission could be worse. Also, the iterations of the scheduler loop have a variable iteration duration—although iterations n, n+1, n+2, n+3, n+5, and n+6 have a duration that is the same, iteration n+4 has a significantly longer iteration. As a result, the delay for delayed transmission (422) for packet p+2 is even longer.

Moreover, a scheduler loop may iterate over multiple active flows of packets, potentially sending packets from any of the multiple flows. This further complicates scheduling packets according to an arbitrary cycle-granularity IPG value.

In typical usage scenarios, the coarse-grained duration of iterations of a scheduler loop, variability in duration of iterations of the scheduler loop, and processing of multiple active flows by the scheduler loop often prevent a transport-layer scheduling mechanism from sending a next packet of a particular flow at a specific cycle that exactly fits the inter-packet spacing for an arbitrary transmission rate. As such, in typical usage scenarios, the sender cannot effectively regulate the flow of packets using fine-grained adjustments to transmission rate and cycle-granularity inter-packet spacing.

V. Packet Scheduling that Approximates Fine-Grained Rate Adjustments and Cycle-Granularity Inter-Packet Spacing This section describes innovations in packet scheduling, which allow a scheduling mechanism to approximate fine-grained rate adjustments and cycle-granularity inter-packet spacing for packets of a flow. In some example implementations, iterations of a scheduler loop of a transport-layer scheduling mechanism have a duration that is variable and coarse-grained. Even so, a sender can specify a cycle-granularity inter-packet spacing, for example, using a cycle-granularity IPG value. The scheduling mechanism includes operations to schedule packets for transmission in a way that approximates the specified inter-packet spacing. This allows the sender to effectively regulate transmission rate in a fine-grained way. Also, in some example implementations, inter-packet spacing can be specified on a per-flow basis, which allows the sender to set different transmission rates for different packet flows.

For example, in a scheduler loop, a sender processes a given packet flow. In particular, in an iteration of the scheduler loop, the sender determines whether the next packet of the flow is due. The next packet has a target next send time. The next packet is due, for example, if the target next send time is before the current time or if the given packet flow was newly added. In some cases, the next packet is not due, and the sender determines whether a proximity condition is satisfied for the next packet of the flow. In general, if the target next send time (although later than the current time) is close enough to the current time, the proximity condition is satisfied and the next packet can be scheduled for transmission. The next packet is also scheduled for transmission if the next packet is due. When the next packet of the flow is scheduled for transmission, the sender sends the next packet and updates the target next send time based at least in part on a target transmission rate. In this way, the scheduling mechanism can schedule packets for transmission in a way that, on average, approximates fine-grained rate adjustments and cycle-granularity inter-packet spacing.

FIG. 5 shows an example (500) of packet spacing according to scheduling that approximates fine-grained rate adjustments and cycle-granularity inter-packet spacing. As in the example (400) of FIG. 4, a target IPG value (410) specifies a cycle-granularity spacing between packets. The target IPG value (410) is not an integer multiple of the typical iteration duration, and a packet cannot be transmitted at any arbitrary cycle within an iteration. As a result, packet p+1 is not transmitted at the exact cycle following the target IPG value (410) after the start of transmission of the first packet p. Instead, the packet p+1 is transmitted late, after a delay for delayed transmission (420). The next packet p+2 is transmitted early, however, before the transmission time specified by the target IPG value (410). The difference between the transmission time specified by the target IPG value (410) and the actual transmission time for packet p+$^2$ is the extent of early transmission (510). With this approach, some packets are transmitted late (delayed transmission) and other packets are transmitted early (early transmission), but on average packets are separated by the target IPG value (410).

This section next describes two alternative approaches with corresponding lightweight hardware implementations that allow a transport-layer scheduling mechanism to approximate fine-grained rate adjustments and cycle-granularity inter-packet spacing.

A. First Approach for Approximating Fine-Grained Rate Adjustments

According to a first approach, a transport-layer scheduling mechanism can approximate fine-grained rate adjustments and cycle-granularity inter-packet spacing by probabilistically selecting iterations of a scheduler loop in which packets are scheduled for transmission. In the first approach, as packets of a packet flow are handled by the transport-layer scheduling mechanism, the packets are timestamped with a target "ideal" send time according to a target transmission rate. For an individual packet, the sender probabilistically selects the scheduler iteration in which to transmit the packet. This results in some of the packets being sent early (ahead of schedule according to the ideal send times) while other packets are sent late (behind schedule according to the ideal send times). Logic controls the ratio of early packets versus late packets for a flow, so that the average transmission rate very closely approximates the target transmission rate.

FIG. 6 shows code (600) for the first approach for approximating fine-grained rate adjustments and cycle-granularity inter-packet spacing. The code (600), which is in a hardware description language, describes the behavior and structure of a digital circuit for the scheduling mechanism. In particular, the code (600) shows operations for part of an iteration of a scheduler loop, which can be performed when deciding whether to schedule the next packet of a given patent flow for transmission. A data structure tracks properties of the given packet flow, including the target next send time of the next packet of the flow (flow.next_send_time) and an indicator of whether the given packet flow was newly added (flow.newly_added). The variable throttle_gap indicates a target IPG value. Although FIG. 6 shows the target IPG value as a separate variable, it can instead be a property of the data structure for the given packet flow.

The variable iteration_window indicates the time it takes for the scheduling mechanism to complete one iteration of the scheduler loop. The value of iteration_window depends on implementation. The value can be fixed to a typical iteration duration (such as 50 cycles), even if iteration durations vary. For example, the value of iteration_window can be an average iteration duration, median iteration duration, or minimum iteration duration.

In an iteration of the scheduler loop, the sender determines a random number in the range of 0 to the variable iteration_window. In the code (600) of FIG. 6, the sender calls the function urandom_range(0, iteration_window), which returns an unsigned integer between 0 and iteration_ window, inclusive at both ends of the range. The sender sets the threshold value lfsr_seq to the random number returned.

The sender also determines the current time (variable current_time) using a call to the function cycles( ), which returns a value in terms of cycles. The sender determines the difference (throttle_compare) between the current time (current_time) and the target next send time of the next packet of the flow (flow.next_send_time). The variable ready_to_send indicates whether the next packet is due. If the target next send time is earlier than the current time, the difference is negative (that is, msb(throttle_compare is 1)), and the next packet is due (ready_to_send is 1). Or, if the flow is newly added (that is, flow.newly_added is 1), the next packet is due (ready_to_send is 1).

If the next packet is due or if a proximity condition is satisfied, the sender schedules the next packet for transmission, setting the variable transmit_now to true. For the proximity condition, the sender compares (a) the difference (throttle_compare) between the target next send time and the current time to (b) the threshold value (lfsr_seq). If the difference is less than the threshold value, the proximity condition is satisfied. Thus, if the difference is within a randomly determined range from zero up to the variable iteration_window, the proximity condition is satisfied.

If the next packet is flagged for transmission (transmit_now is true), the sender transmits the packet by calling the function send_packet(packet). The sender then updates the target next send time by adding the target IPG value (throttle_gap) to the time of transmission of the packet, which is returned by another call to the function cycles( ). Finally, the sender sets flow.newly_added to false, since a packet has been transmitted for the flow.

The following table shows results of processing packets of an example packet flow according to the first approach. In the table, the duration of iterations of the scheduler loop is 50 for all iterations (the value of iteration_window is 50 cycles). The target IPG value is 155 cycles. When a packet is transmitted, the transmission time follows the time checked for scheduling purposes (current_time) by 3 cycles.

In iteration n, the target next send time is 6218 cycles, which is after the current time (6160 cycles), so the value of ready_to_send is false. The proximity condition cannot be satisfied because the difference between the target next send time and current time (6218−6160=58 cycles) is greater than the duration of the iteration window (50 cycles).

In the next iteration n+1, the target next send time of the next packet is still after the current time (6210 cycles), so the value of ready_to_send is false. The proximity condition is satisfied if the difference between the target next send time and current time (6218−6210=8 cycles) is less than a threshold value randomly determined (by a RND( ) function) between 0 and the duration of the iteration window (50 cycles). In the table, the proximity condition is satisfied (shown as ?→yes), and the packet is transmitted. The target next send time is updated by adding the target IPG value to the transmission time (6213 cycles).

Additional packets are processed in successive iterations, as shown. In some cases, the proximity condition is checked but not satisfied (shown as ?→no). In such cases, although the difference between the target next send time and current time is less than the duration of the iteration window, the difference is not less than a threshold value randomly determined between 0 and the duration of the iteration window (50 cycles).

| iteration | next_send_time | current_time | ready_to_send? | proximity satisfied? | schedule packet? | updated send time |
|---|---|---|---|---|---|---|
| n | 6218 | 6160 | false | no | no | n/a |
| n + 1 | 6218 | 6210 | false | maybe; check if 8 < RND(0:50)? → yes | yes | 6213 + 155 = 6368 |
| n + 2 | 6368 | 6260 | false | no | no | n/a |
| n + 3 | 6368 | 6310 | false | no | no | n/a |
| n + 4 | 6368 | 6360 | false | maybe; check if 8 < RND(0:50)? → yes | yes | 6363 + 155 = 6518 |
| n + 5 | 6518 | 6410 | false | no | no | n/a |
| n + 6 | 6518 | 6460 | false | no | no | n/a |
| n + 7 | 6518 | 6510 | false | maybe; check if 8 < RND(0:50)? → yes | yes | 6513 + 155 = 6668 |
| n + 8 | 6668 | 6560 | false | no | no | n/a |
| n + 9 | 6668 | 6610 | false | no | no | n/a |
| n + 10 | 6668 | 6660 | false | maybe; check if 8 < RND(0:50)? → yes | yes | 6663 + 155 = 6818 |
| n + 11 | 6818 | 6710 | false | no | no | n/a |
| n + 12 | 6818 | 6760 | false | no | no | n/a |
| n + 13 | 6818 | 6810 | false | maybe; check if 8 < RND(0:50)? → no | no | n/a |
| n + 14 | 6818 | 6860 | true | n/a | yes | 6863 + 155 = 7018 |
| n + 15 | 7018 | 6910 | false | no | no | n/a |
| n + 16 | 7018 | 6960 | false | no | no | n/a |
| n + 17 | 7018 | 7010 | false | maybe; check if 8 < RND(0:50)? → yes | yes | 7013 + 155 = 7168 |
| n + 18 | 7168 | 7060 | false | no | no | n/a |
| n + 19 | 7168 | 7110 | false | no | no | n/a |
| n + 20 | 7168 | 7160 | false | maybe; check if 8 < RND(0:50)? → yes | yes | 7163 + 155 = 7318 |

The inter-packet spacing is 150 cycles for most packets. For one pair of consecutive packets, the inter-packet spacing is 200 cycles. On average, according to the approach shown in FIG. 6, the inter-packet spacing closely approximates the target IPG value (155 cycles).

B. Second Approach for Approximating Fine-Grained Rate Adjustments

According to a second approach, a transport-layer scheduling mechanism can approximate fine-grained rate adjustments and cycle-granularity inter-packet spacing by delaying transmission for some packets in order to compensate for early transmission of other packets. As in the first approach, as packets of a packet flow are handled by the transport-layer scheduling mechanism, the packets are timestamped with a target "ideal" send time according to a target transmission rate. As a given packet is processed in a current iteration of the scheduler loop, the sender determines the difference between the target next send time for the given packet and the current time. If the difference is less than the time it will take the current iteration to complete, the sender schedules the given packet for transmission in the current iteration. The target next send time for the subsequent packet is updated, so as to delay the subsequent packet and thereby compensate for the early transmission of the given packet. Overall, some of the packets are sent early (ahead of schedule according to the ideal send times) while other packets are sent late (behind schedule according to the ideal send times), but the average transmission rate very closely approximates the target transmission rate.

FIG. 7 shows code (700) for the second approach for approximating fine-grained rate adjustments and cycle-granularity inter-packet spacing. The code (700), which is in a hardware description language, describes the behavior and structure of a digital circuit for the scheduling mechanism. In particular, the code (700) shows operations for part of an iteration of a scheduler loop, which can be performed when deciding whether to schedule the next packet of a given patent flow for transmission. A data structure tracks properties of the given packet flow, including the target next send time of the next packet of the flow (flow.next_send_time) and an indicator of whether the given packet flow was newly added (flow.newly_added). The variable throttle_gap indicates a target IPG value. Although FIG. 7 shows the target IPG value as a separate variable, it can instead be a property of the data structure for the given packet flow.

The variable iteration_window indicates the time it takes for the scheduling mechanism to complete one iteration of the scheduler loop. The value of iteration_window depends on implementation. The value can be fixed to a typical iteration duration (such as 50 cycles), even if iteration durations vary. For example, the value of iteration_window can be an average iteration duration, median iteration duration, or minimum iteration duration.

In an iteration of the scheduler loop, the sender determines the current time using a call to the function cycles( ), which returns a value in terms of cycles. The sender determines the difference (throttle_compare) between the current time (current_time) and the target next send time of the next packet of the flow (flow.next_send_time). The variable ready_to_send indicates whether the next packet is due. If the target next send time is earlier than the current time, the difference is negative (that is, msb(throttle_compare is 1)), and the next packet is due (ready_to_send is 1). Or, if the flow is newly added (that is, flow.newly_added is 1), the next packet is due (ready_to_send is 1).

The sender determines the value of the variable ipg_comp, which is used when updating the target next send time after transmission of the next packet. If the next packet is due (that is, ready_to_send is 1), the value of ipg_comp is 0. Otherwise, the value of ipg_comp is the difference (throttle_compare) between the current time and the target next send time of the next packet of the flow.

If the next packet is due or if a proximity condition is satisfied, the sender schedules the next packet for transmission, setting the variable transmit_now to true. For the time and current time (6218-6160=58 cycles) is greater than the duration of the iteration window (50 cycles).

In the next iteration n+1, the target next send time of the next packet is still after the current time (6210 cycles), so the value of ready_to_send is false. The proximity condition is satisfied, however, because the difference between the target next send time and the current time (6218−6210=8 cycles) is less than the duration of the iteration window (50 cycles). The packet is transmitted, and the target next send time is updated by adding the target IPG value and ipg_comp value (26 cycles) to the transmission time (6213 cycles).

Additional packets are processed in successive iterations, as shown.

| iteration | next_send_time | current_time | ready_to_send? | proximity satisfied? | schedule packet? | updated send time |
|---|---|---|---|---|---|---|
| n | 6218 | 6160 | false | no | no | n/a |
| n + 1 | 6218 | 6210 | false | yes | yes | 6213 + 155 + 8 = 6376 |
| n + 2 | 6376 | 6260 | false | no | no | n/a |
| n + 3 | 6376 | 6310 | false | no | no | n/a |
| n + 4 | 6376 | 6360 | false | yes | yes | 6363 + 155 + 16 = 6534 |
| n + 5 | 6534 | 6410 | false | no | no | n/a |
| n + 6 | 6534 | 6460 | false | no | no | n/a |
| n + 7 | 6534 | 6510 | false | yes | yes | 6513 + 155 + 24 = 6692 |
| n + 8 | 6692 | 6560 | false | no | no | n/a |
| n + 9 | 6692 | 6610 | false | no | no | n/a |
| n + 10 | 6692 | 6660 | false | yes | yes | 6663 + 155 + 32 = 6850 |
| n + 11 | 6850 | 6710 | false | no | no | n/a |
| n + 12 | 6850 | 6760 | false | no | no | n/a |
| n + 13 | 6850 | 6810 | false | yes | yes | 6813 + 155 + 40 |
| n + 14 | 7008 | 6860 | false | no | no | n/a |
| n + 15 | 7008 | 6910 | false | no | no | n/a |
| n + 16 | 7008 | 6960 | false | yes | no | 6963 + 155 + 48 = 7166 |
| n + 17 | 7166 | 7010 | false | no | no | n/a |
| n + 18 | 7166 | 7060 | false | no | no | n/a |
| n + 19 | 7166 | 7110 | false | no | no | n/a |
| n + 20 | 7166 | 7160 | false | yes | no | 7163 + 155 + 6 = 7324 | proximity condition, the sender compares (a) the difference (throttle_compare) between the target next send time and the current time to (b) a threshold value, which is the iteration duration (iteration_window). If the difference is less than the threshold value, the proximity condition is satisfied.

If the next packet is flagged for transmission (transmit_now is true), the sender transmits the packet by calling the function send_packet(packet). The sender then updates the target next send time by adding the target IPG value (throttle_gap) to the time of transmission of the packet, which is returned by another call to the function cycles( ), and the value ipg_comp. Finally, the sender sets flow.newly_added to false, since a packet has been transmitted for the flow.

The following table shows results of processing packets of an example packet flow according to the second approach. In the table, the duration of iterations of the scheduler loop is 50 for all iterations (the value of iteration_window is 50 cycles). The target IPG value is 155 cycles. When a packet is transmitted, the transmission time follows the current time checked for scheduling purposes (current_time) by 3 cycles.

In iteration n, the target next send time is 6218 cycles, which is after the current time (6160 cycles), so the value of ready_to_send is false. The proximity condition is not satisfied because the difference between the target next send The inter-packet spacing is 150 for most packets cycles. For one pair of consecutive packets, the inter-packet spacing is 200 cycles. On average, according to the approach shown in FIG. 7, the inter-packet spacing closely approximates the target IPG value (155 cycles).

In the table, the duration of every iteration is 50 cycles. As a result, the inter-packet spacing is 150 cycles for most packets but occasionally 200 cycles. In some example implementations, the duration of iterations can vary, which tends to cause the inter-packet spacing to vary. Even so, according to the approach shown in FIG. 7, the inter-packet spacing still closely approximates the target IPG value (155 cycles).

Compared to the first approach, the second approach is computationally simpler because it does not involve generation of random numbers for threshold values to check the proximity condition. Also, the second approach works well when the duration of iterations varies, even if for simplicity the value of the variable iteration_window is set to a minimum value but does not change. The second approach assumes, however, that is possible to adjust the next send times for individual packets, which works for some implementations of transport-layer scheduling but might not be possible in other implementations of transport-layer scheduling.

C. Example Techniques for Packet Scheduling

FIG. 8 shows a generalized technique (800) for packet scheduling that approximates fine-grained rate adjustments and cycle-granularity inter-packet spacing. A network interface device, as described with reference to FIG. 1 or otherwise, can perform the technique (800). The technique (800) shows operations from the perspective of a sender, which manages packet scheduling according to a network protocol that implements flow control (e.g., a reliable transport protocol, other transport protocol, network layer protocol).

FIG. 8 shows operations of a scheduler loop that are relevant to flow control. Other operations of the scheduler loop (such as operations to packetize data, operations to process acknowledgement feedback from a receiver, and operations to check a timeout condition or other condition for a retransmission mechanism) are not shown. In some example implementations, a scheduler loop has multiple stages for a transport-layer scheduling mechanism, including (a) a first stage for accepting new data, if any, to be packetized; (b) a second stage for receiving acknowledgement feedback, if any, and checking a timeout condition and/or other condition of a retransmission mechanism; (c) a third stage for bookkeeping tasks, if any; (d) a fourth stage for scheduling and sending of packets, if any; and (e) a fifth stage for updating state information, if appropriate. A packet can be sent only during the fourth stage of the scheduler loop. An iteration of the scheduler loop has a duration that is significantly longer than a single cycle, however, which prevents the sender from sending a packet at any arbitrary cycle.

As another complication, the iteration duration of the scheduler loop can be variable due to conditional paths in some stages. In particular, bookkeeping tasks are skipped in most iterations, but can increase the duration of an iteration by a significant but variable amount when performed.

FIG. 8 shows operations of a scheduler loop for processing of a given packet flow. In some example implementations, the sender can process multiple packet flows in the scheduler loop. In an iteration of the scheduler loop, the sender can perform operations for multiple active flows, which further complicates scheduling of packets for transmission.

With reference to FIG. 8, the sender checks (810) whether to start an iteration (next iteration) of a scheduler loop. If so, the sender performs various operations for processing of the given packet flow in the iteration of the scheduler loop.

The sender can dynamically adjust a target transmission rate in response to network feedback. The sender checks (820) whether network feedback has been received. If so, the sender sets (822) the target transmission rate based at least in part on the network feedback. For example, in response to network congestion, the sender decreases the target transmission rate. Or, in response to a positive assessment about network conditions, the sender increases the target transmission rate. The target transmission rate can have an initial value before any network feedback has been received, such as a default value or value from previous activity.

The transmission rate can be specified in various ways. In some example implementations, the target transmission rate is a target IPG value, which indicates an amount of spacing between consecutive packets, for example, as the difference between start times for the consecutive packets. To increase transmission rate, the sender can decrease the target IPG value. Or, to decrease the transmission rate, the sender can increase the target IPG value. The target IPG value can be a per-flow target IPG value associated with a given packet flow, in which case different active packet flows can have different per-flow target IPG values.

To get network feedback, the sender can monitor a network and receive feedback about network conditions. The network feedback can include explicit feedback from a network router, such as information provided according to the Explicit Congestion Notification ("ECN") approach or another approach. The network feedback can also include implicit feedback about packet losses or packet delays from a network switch or receiver, such as information in ACK packets or SACK information. Or, the network feedback can be information about round trip times ("RTTs") for packets. In general, the network feedback can be from a network router, a network switch, a receiver, and/or another entity, and the network feedback can provide information about network congestion, packet losses, packet delays, packet latencies, and/or other indicators of network conditions. In some example implementations, operations of the scheduler loop happen at a first time scale (e.g., at the scale of nanoseconds or tens of nanoseconds), but adjustments to the target transmission rate happen at much longer time scale (e.g., at the scale of tenths of seconds or longer).

A target IPG value can be set at the granularity of individual cycles of a scheduler loop. In some example implementations, the target IPG value is set in the range of about 120 cycles to about 300 cycles. For example, the target IPG value can be 128 cycles, 129 cycles, 130 cycles, and so on. In comparison, the iteration duration for any given iteration of the scheduler loop is between 50 and 95 cycles, and an average iteration duration of the scheduler loop is slightly more than 50 cycles. Thus, the target IPG value is between two times and six times longer than an average iteration duration of the scheduler loop.

With reference to FIG. 8, in the iteration of the scheduler loop, the sender determines (830) whether a next packet of the given packet flow is due. The next packet is due if a target next send time is earlier than a current time. To determine whether the next packet is due, the sender can simply compare the current time and the target next send time. Or, the sender can determine a difference between the target next send time and the current time, and then consider the difference when determining whether the next packet is due. The next packet of the given packet flow can be considered due for other reasons. For example, the next packet of the given packet flow can be considered due if the given packet flow was newly added. To check this, the sender can determine whether the given packet flow was newly added. Alternatively, the next packet of the given packet flow can be considered due if no packets of the given packet flow have been sent yet. To check this, the sender can determine whether any packets of the given packet flow have been sent.

As part of the iteration of the scheduler loop, the sender determines (840) whether a proximity condition is satisfied for the next packet of the given packet flow. The proximity condition depends at least in part on how long the target next send time is after the current time. In general, if the target next send time (although later than the current time) is close enough to the current time, the proximity condition is satisfied and the next packet can be scheduled for transmission.

For example, to determine whether the proximity condition is satisfied for the next packet, the sender determines a difference between the target next send time and the current time. The sender also determines a threshold value that depends on an estimate of iteration duration for the scheduler loop (e.g., an estimate of minimum cycles, median cycles, or average cycles per iteration of the scheduler loop; or an estimate of actual cycles for a specific iteration). In some example implementations, the iteration duration can vary between at least some iterations of the scheduler loop.

The threshold value can be determined in different ways, depending on implementation. For example, for a first approximation approach, the sender determines a random number between 0 and the estimate of iteration duration for the scheduler loop, then sets the threshold value to the random number. As another example, for a second approximation approach, the sender simply sets the threshold value as the estimate of iteration duration for the scheduler loop. Alternatively, the threshold value can be determined in another way.

The sender compares the difference to the threshold value—satisfaction of the proximity condition depends on a result of the comparison of the difference to the threshold value. For example, the proximity condition is satisfied if the difference is less than the threshold value.

The sender determines (850) whether to schedule the next packet of the given packet flow for transmission. The next packet is scheduled for transmission if the next packet is due or if the proximity condition is satisfied for the next packet. When the next packet of the given packet flow is scheduled for transmission, the sender sends (852) the next packet and updates (854) the target next send time based at least in part on the target transmission rate. After updating (880) the target next send time, or if the next packet is not scheduled for transmission, the sender checks (830) whether to start the next iteration of the scheduler loop.

The target next send time can be updated in different ways, depending on implementation. For example, for the first approximation approach, the sender determines a transmission time and adds the target IPG value to the transmission time. The updated target next send time is equal to the transmission time plus the target IPG value. As another example, for the second approximation approach, the sender determines a transmission time and also determines if the difference between the target next send time and the current time is greater than zero. If so, the sender combines the transmission time, the target IPG value, and the difference. Otherwise, the sender adds the target IPG value to the transmission time. The updated target next send time is equal to the transmission time plus the target IPG value plus, if the difference is greater than zero, the difference.

FIG. 8 shows operations to dynamically adjust the target transmission rate as part of the same scheduler loop as operations to schedule the next packet of a given packet flow for transmission. Alternatively, the operations to dynamically adjust the target transmission rate can be part of different processing loop.

In FIG. 8, the scheduler loop includes operations to determine whether the next packet of a given packet flow is due and also includes operations to determine whether the proximity condition is satisfied for the next packet. In practice, the operations to determine whether the proximity condition is satisfied for the next packet can be conditionally performed—the sender performs the operations to determine whether the proximity condition is satisfied for the next packet only after determining the next packet is not due. Or, as another alternative, the operations to determine whether the next packet is due can be conditionally performed—the sender performs the operations to determine whether the next packet is due only after determining the proximity condition is not satisfied for the next packet.

D. Results in Some Example Implementations

Figure 9:
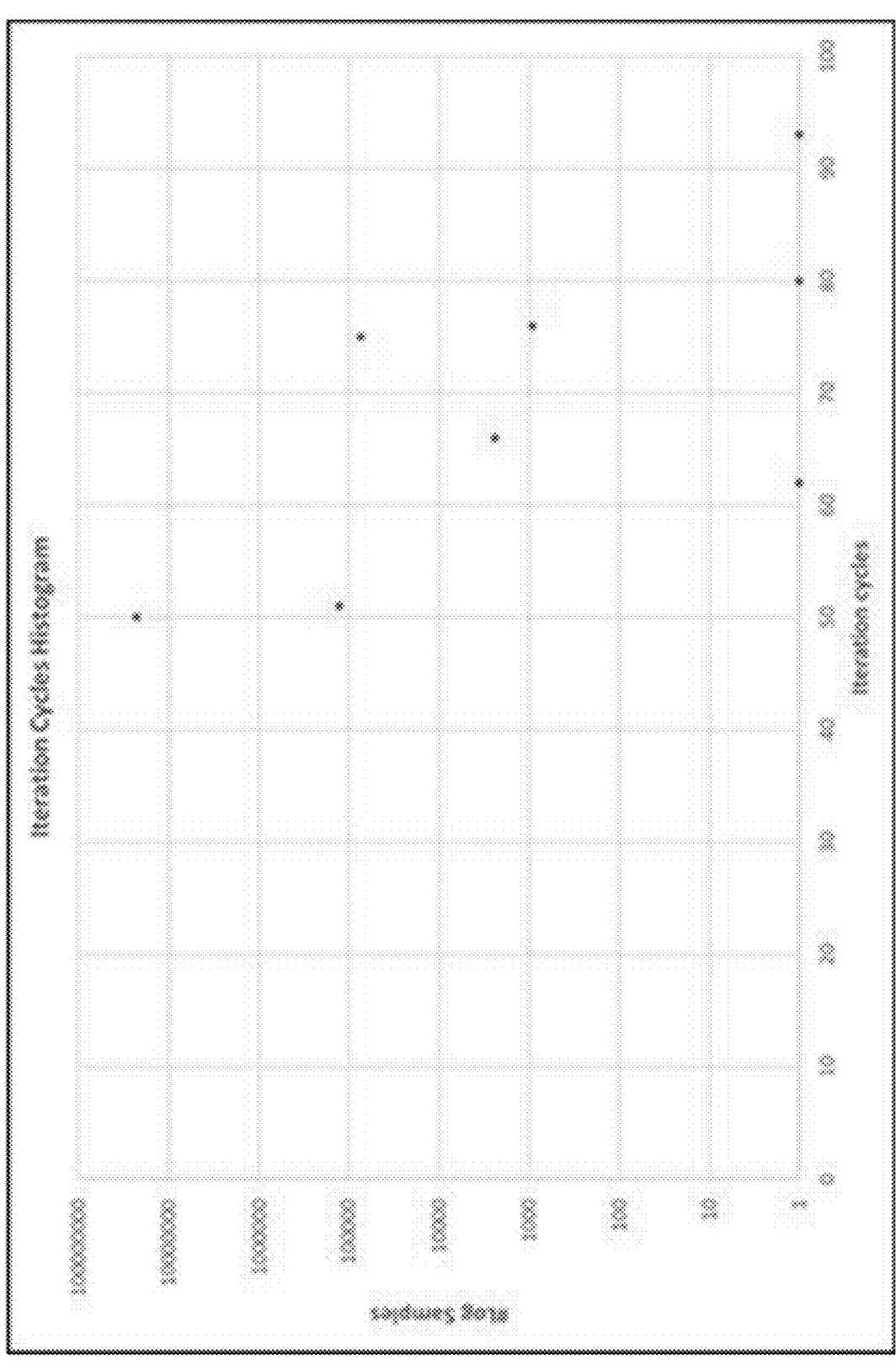
FIG. 9 is a chart that shows relative frequencies of different iteration durations for a scheduler loop of a transport-layer scheduling mechanism.

FIG. 9 shows the relative frequencies (900) of different iteration durations for a scheduler loop of a transport-layer scheduling mechanism in some example implementations. Specifically, FIG. 9 is a histogram that shows the relative frequencies of different numbers of cycles for iterations of the scheduler loop. The horizontal axis indicates counts of cycles. The vertical axis indicates, on a logarithmic scale, the frequencies of different counts of cycles. Most iterations of the scheduler loop have an iteration duration of 50 cycles. A very small number of iterations (less than 2% overall) have a different duration between 50 cycles and 95 cycles. The average iteration duration is slightly more than 50 cycles.

FIG. 10 shows effective throughput (1000) for different IPG values according to two different transport-layer scheduling mechanisms. The first transport-layer scheduling mechanism uses the second approximation approach, as described above with reference to FIG. 7. The effective throughput is shown as "goodput" (that is, useful throughput excluding retransmission overhead). For IPG values ranging from 150 cycles to about 275 cycles, the effective throughput (1010) for the first transport-layer scheduling mechanism closely tracks the effective throughput for an ideal cycle-level scheduler. The IPG values from 150 cycles to about 275 cycles correspond to transmission rates of 100 Gpbs to 50 Gbps in the example implementations.

For comparison, the second transport-layer scheduling mechanism is a baseline mechanism. The second transport-layer scheduling mechanism sends a next packet for a packet flow in the iteration in which the target next send time elapses. For many of the IPG values, the effective throughput (1020) for the second transport-layer scheduling mechanism is much worse than the first transport-layer scheduling mechanism. For the IPG value of 200 cycles, which is an integer multiple of the iteration duration of 50 cycles (most iterations), packets are sent in optimal iterations. Otherwise, as the IPG value deviates from the IPG value of 200 cycles, performance deteriorates as transmissions of packets are delayed. The graph in FIG. 10 shows a steep drop in performance after the IPG value of 200 cycles. A similar "stair-step" pattern is expected at the IPG value of 250 cycles but not shown because there are no data points between 220 cycles and 260 cycles.

E. Technical Advantages

With innovations described herein, packet scheduling approximates fine-grained rate adjustments and cycle-granularity inter-packet spacing for packets of a flow. In example usage scenarios, iterations of a scheduler loop of a transport-layer scheduling mechanism have a duration that is variable and coarse-grained. Even so, a sender can specify a cycle-granularity inter-packet spacing. The scheduling mechanism includes operations to schedule packets for transmission in a way that approximates the specified inter-packet spacing. This allows the sender to effectively regulate transmission rate in a fine-grained way.

F. Alternatives

In many of the examples described herein, a scheduler loop in a transport-layer scheduling mechanism approximates fine-grained rate adjustments and cycle-granularity inter-packet spacing for transport-layer packets of a flow. The transport-layer scheduling mechanism implements a reliable transport protocol. Alternatively, approaches described herein can be implemented for flow control operations in another network protocol, allowing a scheduling mechanism to approximate fine-grained rate adjustments and cycle-granularity inter-packet spacing for packets of a flow for that network protocol.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system, a method of packet scheduling, the method comprising, in an iteration of a scheduler loop:
   determining whether a proximity condition is satisfied for a next packet of a given packet flow, the proximity condition depending at least in part on how long a target next send time is after a current time;
   determining whether to schedule the next packet of the given packet flow for transmission, wherein the next packet of the given packet flow is scheduled for transmission if the next packet of the given packet flow is due or if the proximity condition is satisfied for the next packet of the given packet flow; and
   when the next packet of the given packet flow is scheduled for transmission, sending the next packet of the given packet flow and updating the target next send time based at least in part on a target transmission rate.

2. The method of claim 1, wherein the target transmission rate is a per-flow target inter-packet gap value associated with the given packet flow.

3. The method of claim 1, further comprising:
   receiving network feedback;
   based at least in part on the network feedback, setting the target transmission rate.

4. The method of claim 3, wherein the network feedback is from a network router, a network switch, and/or a receiver, and wherein the network feedback provides information about network congestion, packet losses, packet delays, and/or packet latencies.

5. The method of claim 1, further comprising, in the iteration of the scheduler loop:
   determining whether the next packet of the given packet flow is due, wherein the next packet of the given packet flow is due if the target next send time is earlier than the current time.

6. The method of claim 5, further comprising, in the iteration of the scheduler loop:
   comparing the current time and the target next send time; or
   determining a difference between the target next send time and the current time, wherein the determining whether the next packet of the given packet flow is due considers the difference.

7. The method of claim 1, further comprising, in the iteration of the scheduler loop:
   determining whether any packets of the given packet flow have been sent, wherein the next packet of the given packet flow is due if no packets of the given packet flow have been sent yet; or determining whether the given packet flow was newly added, wherein the next packet of the given packet flow is due if the given packet flow was newly added.

8. The method of claim 1, further comprising, in the iteration of the scheduler loop:
   determining a difference between the target next send time and the current time;
   determining a threshold value that depends on an estimate of iteration duration for the scheduler loop; and
   comparing the difference to the threshold value, wherein satisfaction of the proximity condition depends on a result of the comparison of the difference to the threshold value.

9. The method of claim 8, wherein the estimate of iteration duration is an estimate of minimum cycles, median cycles, or average cycles per iteration of the scheduler loop.

10. The method of claim 8, wherein the iteration duration varies between at least some iterations of the scheduler loop.

11. The method of claim 8, wherein the determining the threshold value includes:
   determining a random number between 0 and the estimate of iteration duration for the scheduler loop; and
   setting the threshold value to the random number.

12. The method of claim 11, wherein the target transmission rate is a target inter-packet gap value, wherein the updating the target next send time includes:
   determining a transmission time; and
   adding the target inter-packet gap value to the transmission time.

13. The method of claim 8, wherein the determining the threshold value includes:
   setting the threshold value as the estimate of iteration duration for the scheduler loop.

14. The method of claim 13, wherein the target transmission rate is a target inter-packet gap value, and wherein the updating the target next send time includes:
   determining a transmission time;
   determining if the difference is greater than zero;
   if the difference is greater than zero, combining the transmission time, the target inter-packet gap value, and the difference; and
   otherwise, combining the transmission time and the target inter-packet gap value.

15. The method of claim 1, wherein the scheduler loop is part of a transport-layer scheduling mechanism, wherein the iteration of the scheduler loop has multiple stages, the multiple stages including (a) a first stage for accepting new data, if any; (b) a second stage for receiving acknowledgement feedback, if any, and checking a condition of a retransmission mechanism; (c) a third stage for bookkeeping tasks, if any; (d) a fourth stage for scheduling and sending of packets, if any; and (e) a fifth stage for updating state information, if appropriate, and wherein iteration duration of the scheduler loop is variable due to conditional paths in at least one of the multiple stages.

16. The method of claim 1, wherein a data structure tracks properties of the given packet flow, the properties including one or more of the target next send time, an indicator of whether the given packet flow was newly added, and the target transmission rate.

17. The method of claim 1, further comprising:
   in the scheduler loop, processing multiple packet flows, the multiple packet flows including the given packet flow, including performing operations in the iteration of the scheduler loop for the multiple packet flows.

18. The method of claim 1, wherein the target transmission rate is a target inter-packet gap value, and wherein:

the target inter-packet gap value is between 120 and 300 cycles, and wherein an average iteration of the scheduler loop is between 50 and 60 cycles; or the target inter-packet gap value is between 2 times and 6 times longer than an average iteration of the scheduler loop.

19. One or more non-transitory computer-readable media having stored thereon computer-executable instructions for causing one or more processing units, when programmed thereby, to perform operations for packet scheduling, the operations comprising:

determining whether a proximity condition is satisfied for a next packet of a given packet flow, the proximity condition depending at least in part on how long a target next send time is after a current time;

determining whether to schedule the next packet of the given packet flow for transmission, wherein the next packet of the given packet flow is scheduled for transmission if the next packet of the given packet flow is due or if the proximity condition is satisfied for the next packet of the given packet flow; and when the next packet of the given packet flow is scheduled for transmission, sending the next packet of the given packet flow and updating the target next send time based at least in part on a target transmission rate.

20. A computer system comprising one or more processing units, memory, and a network interface device, the network interface device being configured to perform operations for packet scheduling, the operations comprising:

determining whether a proximity condition is satisfied for a next packet of a given packet flow, the proximity condition depending at least in part on how long a target next send time is after a current time;

determining whether to schedule the next packet of the given packet flow for transmission, wherein the next packet of the given packet flow is scheduled for transmission if the next packet of the given packet flow is due or if the proximity condition is satisfied for the next packet of the given packet flow; and when the next packet of the given packet flow is scheduled for transmission, sending the next packet of the given packet flow and updating the target next send time based at least in part on a target transmission rate.

* * * * *